United States Patent [19]

Kakeno et al.

[11] 4,291,316
[45] Sep. 22, 1981

[54] SYSTEM FOR DRIVING INK DROP GENERATOR OF INK-JET PRINTER

[75] Inventors: Sadao Kakeno, Yokohama; Taisen Hayashi, Tokyo; Hiromichi Komai, Kawasaki; Hiroshi Yamazaki, Tokyo, all of Japan

[73] Assignee: Ricoh Co., Ltd., Tokyo, Japan

[21] Appl. No.: 50,458

[22] Filed: Jun. 20, 1979

[30] Foreign Application Priority Data

Jun. 27, 1978 [JP] Japan .................................. 53-77785

[51] Int. Cl.³ .......................................... G01D 15/18
[52] U.S. Cl. .............................................. 346/140 R
[58] Field of Search ........................... 346/140 PD, 75

[56] References Cited

U.S. PATENT DOCUMENTS

| | | | |
|---|---|---|---|
| 3,848,118 | 11/1974 | Rittberg | 346/75 X |
| 3,988,745 | 10/1976 | Sultan | 346/140 |
| 4,045,801 | 8/1977 | Iwasaki | 346/140 PD |
| 4,068,144 | 1/1978 | Toye | 346/75 X |
| 4,104,645 | 8/1978 | Fischbeck | 346/140 PD |

Primary Examiner—Joseph W. Hartary
Attorney, Agent, or Firm—Burgess, Ryan & Wayne

[57] ABSTRACT

In one embodiment of the present invention an ink manifold is divided into a first ink chamber communicated with an ink drop issuing nozzle and a second ink chamber communicated with an ink source and the first ink chamber through a narrow passage. First and second piezoelectric elements are mounted in opposed relationship with the first and second ink chambers, respectively. The second piezoelectric element is normally applied with such a second driving voltage that the ink will not issue through the nozzle. The frequency of a first driving voltage applied to the first piezoelectric element is twice as high as that of the second driving voltage, and the first driving voltage is selectively applied in synchronism with the second driving voltage only during the positive going half cycle thereof so that an ink drop may be issued through the nozzle during the positive going half cycle of the first driving voltage. In another embodiment of the present invention a plurality of ink drop generating cells substantially similar in construction to the ink drop generator described above are assembled to provide an ink drop generator having an array of nozzle matrix.

3 Claims, 13 Drawing Figures

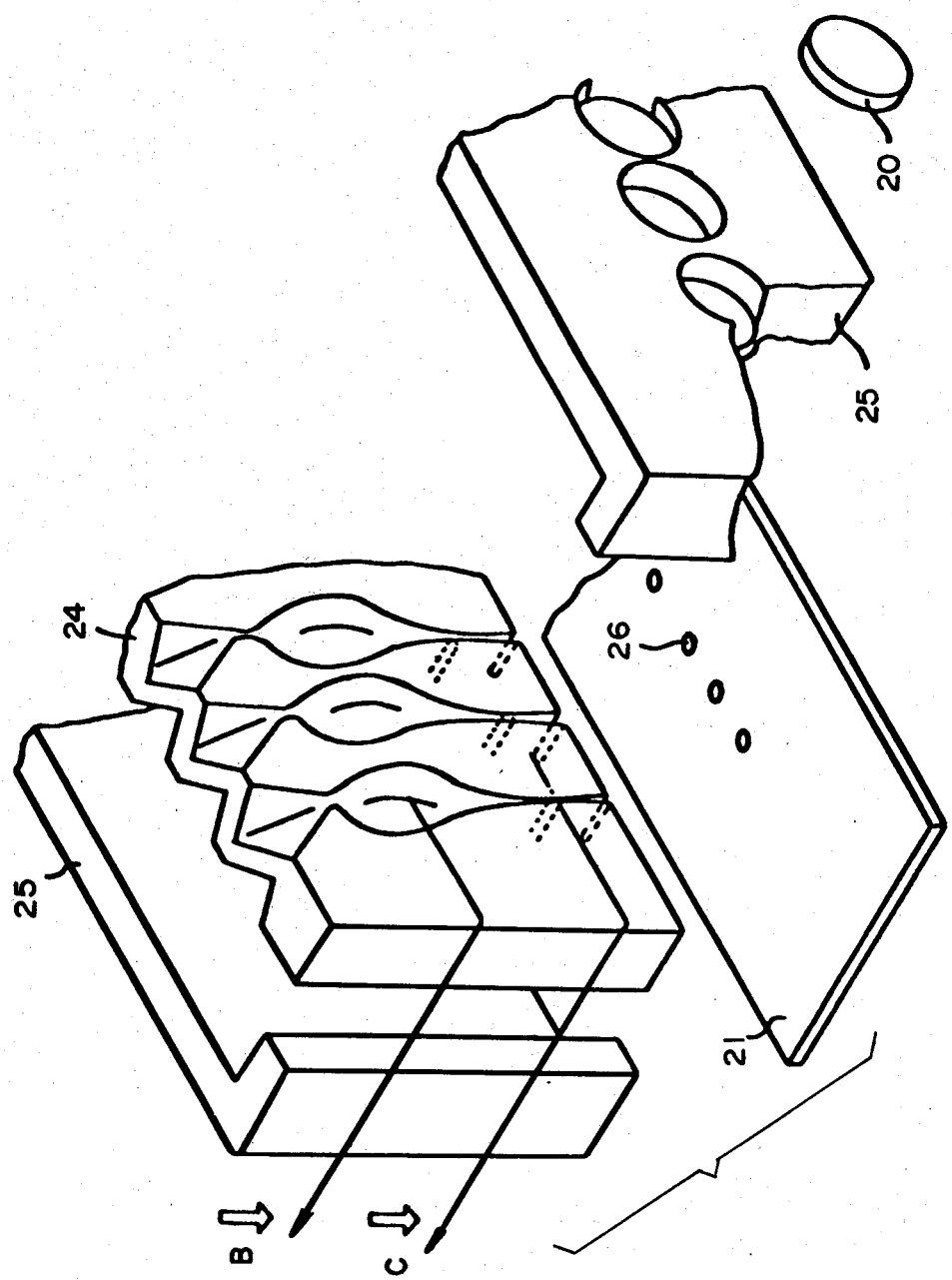

4,291,316

SYSTEM FOR DRIVING INK DROP GENERATOR OF INK-JET PRINTER

BACKGROUND OF THE INVENTION

The present invention relates to a system for driving an ink drop generator of an ink-jet printer.

In the prior art ink drop generators, the pressure in an ink manifold is made negative so as to aspirate the ink so that the ink manifold also tends to aspirate the air through an ink issuing nozzle. In practice, however, because of the surface tension of the ink and the capillary action in the nozzle, the suction of the air into the manifold is prevented. However as the ink drop frequency is increased, the ink must be replenished within a very short time, the volume of replenished ink being equal to the volume of an ink drop issued. As a result the pressure in the ink manifold becomes more negative so that the air is also sucked through the nozzle.

Furthermore in the prior art multi-nozzle ink drop generators, a common piezoelectric element is generally used so that the pressure waves are dispersed and consequently not concentrated on each nozzle. As a result, the ink drop issuing efficiency is low.

There has been invented and demonstrated an ink drop generator of the type provided with two piezoelectric elements so as to impart mechanical excitation to two ink chambers in an ink manifold. However, because of the angular displacement between the two piezoelectric elements, the pressure waves are out of phase and the volumes of ink issued from the two chambers are different. As a result, the point at which the ink jet breaks into ink drops varies and the resulting ink drops are varied in size.

SUMMARY OF THE INVENTION

One of the objects of the present invention is to provide a system for driving an ink drop generator of an ink-jet printer which may issue the ink drops at a high frequency without causing the suction of the air.

Another object of the present invention is to provide an ink drop generator wherein each of many ink drop generating cells is not only applied with a bias pressure but also an ink issuing pressure so that a large number of nozzles may be arrayed in a matrix form at an extremely high density.

BRIEF DESCRIPTION OF THE DRAWINGS

FIG. 8 is an exploded perspective view of the multiple nozzle ink drop generator unit;

DESCRIPTION OF THE PREFERRED EMBODIMENTS

First Embodiment, FIGS. 1–4

Figure 1:
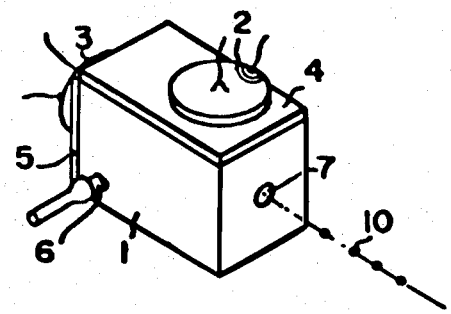
FIG. 1 is a perspective view of a first embodiment of an ink drop generator in accordance with the present invention.
Figure 2:
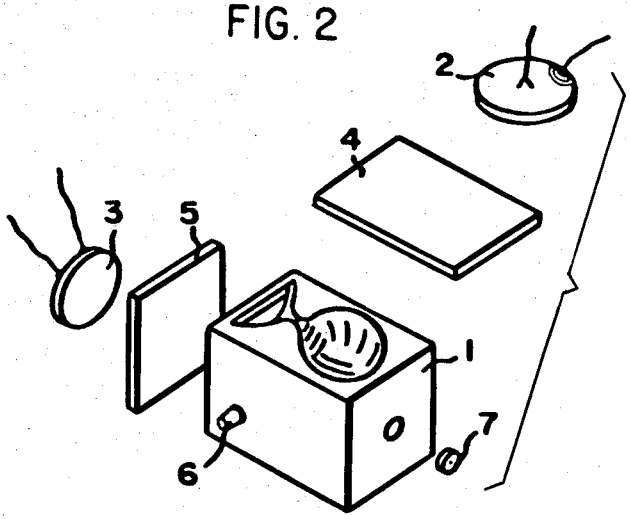
FIG. 2 is an exploded perspective view thereof.
Figure 3:
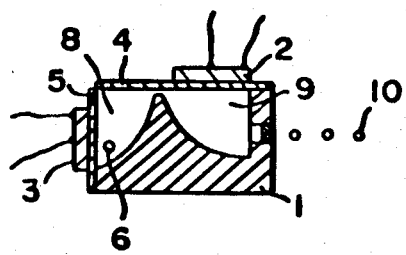
FIG. 3 is a longitudinal sectional view thereof.

Referring to FIGS. 1–3, an ink drop generator in accordance with the present invention comprises a main body 1, a first or ink drop issuing piezoelectric element 2 attached to a first or ink drop issuing diaphragm 4 which in turn is mounted on the top of the main body 1 and a second or biasing piezoelectric element 3 attached to a second or biasing diaphragm 5 mounted on the wall opposite to the wall having an ink drop issuing nozzle 7. The main body 1 has a second or biasing ink chamber 8 with an ink inlet 6 and a first or ink issuing chamber 9 from which ink drops 10 emerge as shown in FIG. 3. The first and second ink chambers 9 and 8 are communicated with each other through a narrow passage. The first and second diaphragms 4 and 5 may be brazed to the main body 1.

Next referring further to FIG. 4, the mode of operation of the ink drop generator with the above construction will be described. The second piezoelectric element 3 is driven by the voltage shown in FIG. 4(a) while as shown in FIG. 4(b) the first piezoelectric element 2 is driven intermittently by a voltage which is applied at a frequency twice as high as that of the driving voltage (a) during the positive going half cycle thereof. The vibrations of the second diaphragm 5 alone are such that no ink drop is issued through the nozzle 7; that is, the ink is pressurized to such an extent that a meniscus of ink is formed at the nozzle 7. When the vibrations of the first diaphragm 4 are superposed on the vibrations of the second diaphragm 5, then ink drops are formed.

Figure 4:
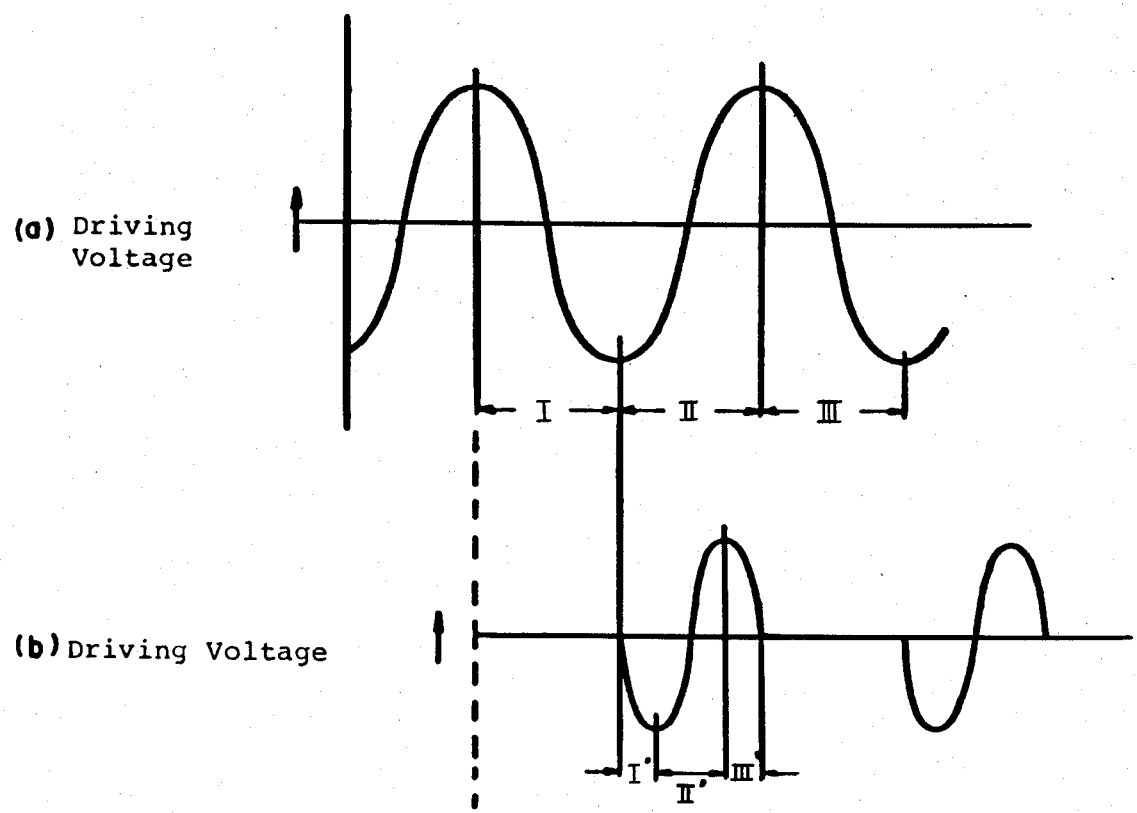
FIG. 4(a) shows a driving voltage applied to a second piezoelectric element thereof; that is, an element for imparting to the ink bias mechanical excitation.
FIG. 4(b) shows a driving voltage applied to a first piezoelectric element thereof; that is, an element for imparting mechanical excitation to the bias-pressured ink so as to issue ink drops.

During the time intervals I and III shown in FIG. 4, the first diaphragm 4 is deactivated while the second diaphragm is activated so as to suck the ink into the second ink chamber 8. In this case, no negative pressure is generated at the nozzle 7. During the time period I' when the driving voltage (a) rises, the second ink chamber 8 is decreased in volume but is increased in pressure so that the ink flows from the second ink chamber 8 into the first ink chamber 9. During the same time interval I' when the driving voltage (b) drops, the first ink chamber 9 is increased in volume but is decreased in pressure so that the first ink chamber 9 sucks the ink from the second ink chamber 8. Thus the pressure drop in the first ink chamber 9 is compensated by the pressure rise in the second ink chamber 8 so that no negative pressure rise occurs. During the time interval II' when both the driving voltages (a) and (b) rise, both the first and second ink chambers 9 and 8 are increased in pressure so that the resultant pressure rise causes an ink drop to issue through the nozzle 7. During the time interval III' when the driving voltage (a) still rises while the driving voltage (b) falls, the pressure increase in the second ink chamber 8 is cancelled by the pressure drop in the first ink chamber 9 as in the case of I' so that no negative pressure rise results.

In summary, the vibrations of the second diaphragm 5 cause the ink to flow into the second ink chamber 8, and when the vibrations of the first diaphragm 4 are superposed on those of the second diaphragm 5, the ink drops are issued through the nozzle 7. When the ink is sucked into the second ink chamber 8, no rapid negative pressure buildup occurs so that the suction of the air may be avoided. Furthermore only small driving voltages are needed. Since the response frequencies may be improved so that the dispersion of the pressure waves may be eliminated and consequently the ink drop issuing efficiency may be considerably improved.

Second Embodiment, FIGS. 5–11

Figure 5:
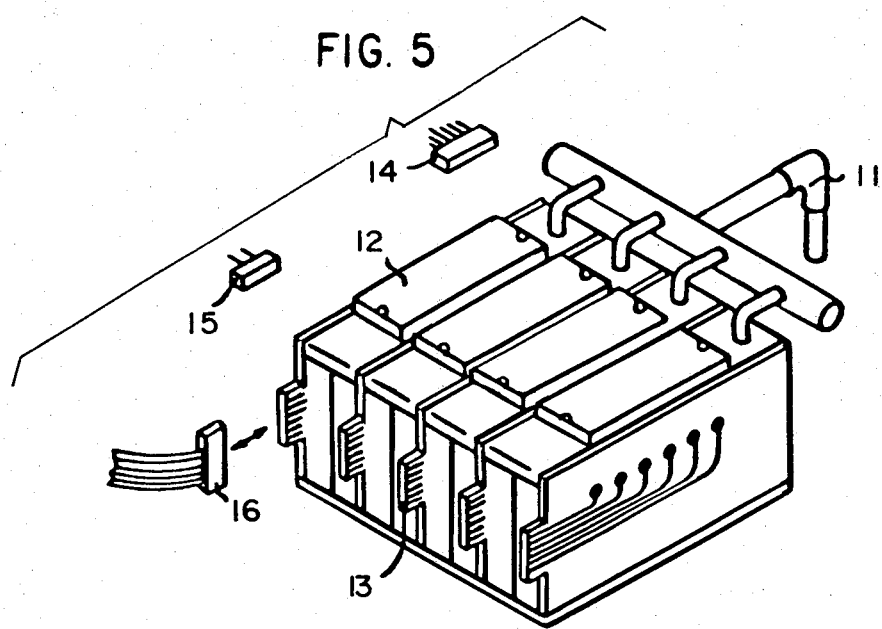
FIG. 5 is a perspective view of a second embodiment of the present invention having a large number of nozzles in the form of matrix at an extremely high density.

In FIG. 5 is shown a multiple nozzle or nozzle-matrix type ink drop generator in accordance with the present invention. An ink supply tube is shown at 11; 12 is a second or biasing piezoelectric element; 13, a printed circuit board for driving first or ink drop issuing piezoelectric elements 20; 14 and 15, connectors for connecting the second piezoelectric elements to a driving circuit (not shown); and 16, a connector for connecting the printed circuit board 13 to a driving circuit (not shown).

Figure 6:
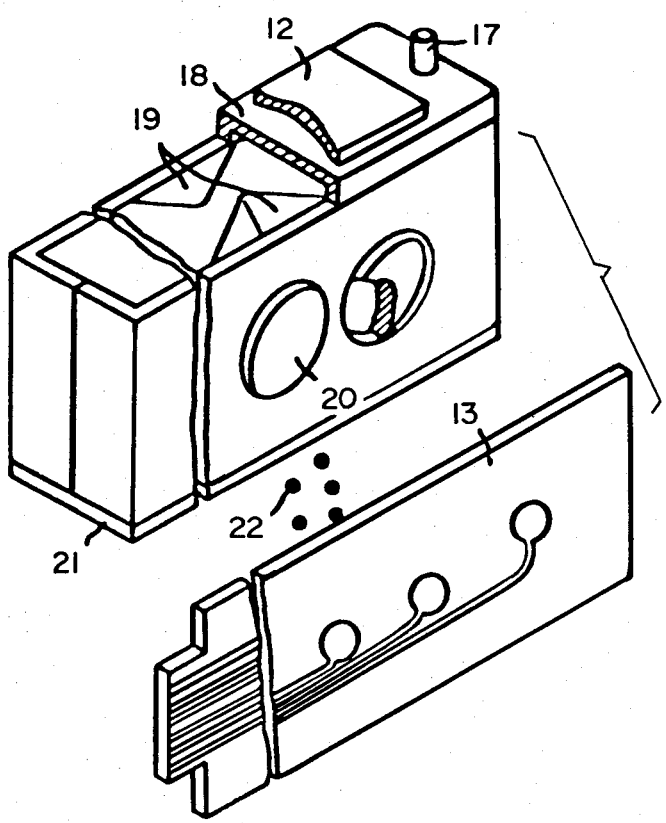
FIG. 6 is a perspective view of one of multiple nozzle ink drop generator units of the ink drop generator shown in FIG. 5.

In FIG. 6 is shown one of the multiple nozzle ink drop generator units which constitute the nozzle matrix type ink drop generator shown in FIG. 5 and each of which has a plurality of ink drop generating cells. There is an ink inlet 17; 18 is a second or biasing diaphragm; 19, a second or biasing ink chamber; 20, the first piezoelectric element; 21, a nozzle plate in which a plurality of nozzles are lined up; and 22, ink drops.

Figure 7:
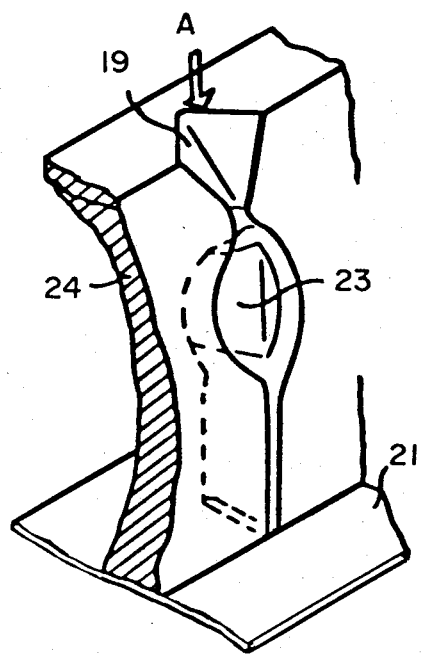
FIG. 7 is a perspective view of one of ink drop generating cells in the unit shown in FIG. 6.

FIG. 7 is an exploded perspective view of the unit shown in FIG. 6. 23 is a first or ink issuing chamber; 24, a multiple head base; and A, the direction of the flow of ink.

In FIG. 8, 25 is the first diaphragms which are driven by the first piezoelectric elements 20.

Figure 9A:
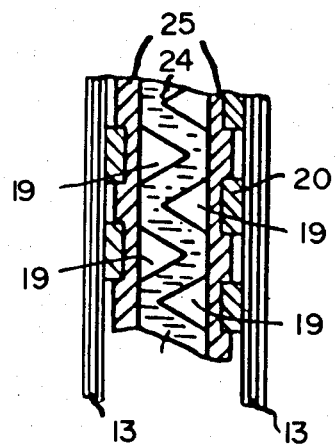
FIG. 9(a) is a sectional view taken along the line B in FIG. 8.
Figure 9B:
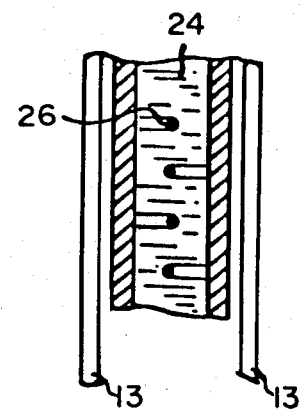
FIG. 9(b) is a sectional view taken along the line C of FIG. 8.

FIG. 9(a) is a sectional view taken along the line B in FIG. 8 and FIG. 9(b) is a sectional view taken along the line C of FIG. 8.

Figure 10:
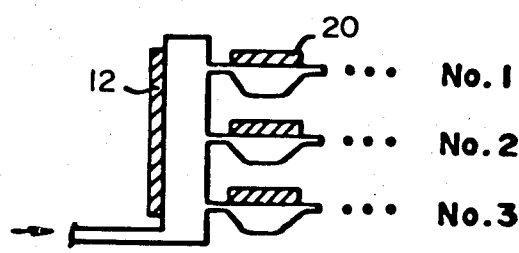
FIG. 10 is a view used for the explanation of the mode of operation of the second embodiment.
Figure 11:
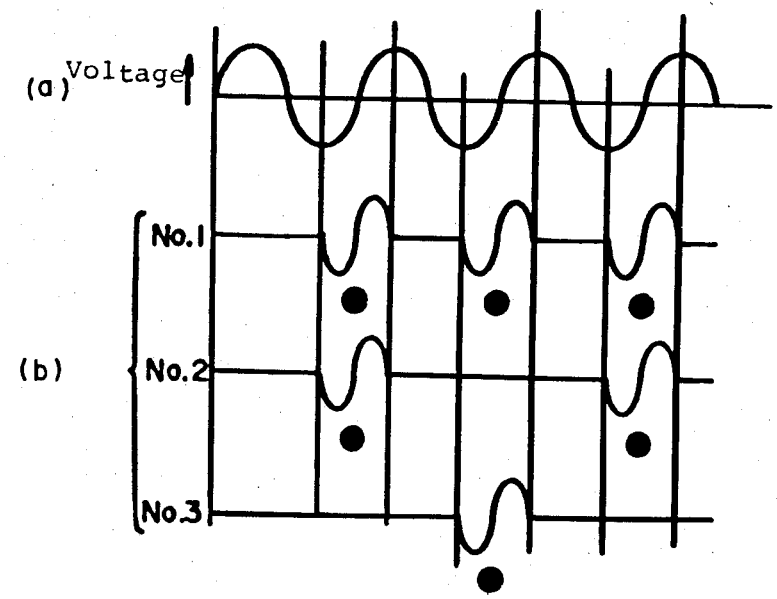
FIG. 11 shows the driving voltage waveforms applied to the ink drop generator shown in FIG. 5.

Referring further to FIGS. 10 and 11, the mode of operation of the nozzle matrix type ink drop generator with the above construction will be described. The second piezoelectric elements 12 are applied with the driving voltage as shown at (a) in FIG. 11. For instance, the second piezoelectric elements 12 are driven by the driving voltage of for instance 2 KHz so as to vibrate the second diaphragms 18 so that the ink may be pressurized but no ink drop may be formed. The first piezoelectric elements 20 are applied with the driving voltages as shown at (b) in FIG. 11. That is, each of the first piezoelectric elements 20 is intermittently applied with the driving voltage No. 1, No. 2 or No. 3 during the positive going half cycles of the driving voltage (a), the frequency of the driving voltages (b) being twice as high as that of the driving voltage (a).

The ink aspiration and ink drop issuing operations will be described in conjunction with the nozzle at No. 1 position in the nozzle matrix array shown in FIG. 10. In the first ⅛ cycle of the driving voltage (a), the latter rises while the driving voltage No. 1 drops so that the pressure rise in the second ink chamber 19 is cancelled by the pressure drop in the first ink chamber 23. In the second and third ⅛ cycles both the driving voltages (a) and No. 1 rise so that the pressure rise in the second ink chamber 19 is superposed on the pressure rise in the first ink chamber 23 so that an ink drop (black dot) is issued through the nozzle 26. In the fourth ⅛ cycle the driving voltage (a) is still rising but the driving voltage No. 1 drops so that the pressure rise in the second ink chamber is cancelled by the pressure drop in the first ink chamber 23. During the negative going half cycle of the driving voltage (a) no driving voltage (b) is applied to the first piezoelectric element 20. Same is true for the nozzles at the positions No. 2 and No. 3.

Since the bias pressure is applied to the ink, the ink drops may be formed by the application of the vibrations of a small amplitude. As a result, the first piezoelectric elements 20 may be reduced in size. For instance, when the first piezoelectric element with a diameter of 5 mm and a thickness of 0.3 mm is driven with the driving voltage of 200 V, the ink drops of a diameter of about 0.1 mm may be issued. Therefore the packaging density of the nozzle matrix type the ink drop generator may be considerably increased.

As shown in FIGS. 6 and 8, the multiple nozzle ink drop generator unit is in the form of a very thin box and the printed circuit board 13 is interposed between the adjacent units in order to establish the electrical connection with the first piezoelectric elements 20. A plurality of such drop generator units with the printed circuit boards 13 are laminated or stacked to form the nozzle matrix type ink drop generator shown in FIG. 5. The second piezoelectric elements 12 are connected through the connectors 14 and 15 to the driving circuit (not shown) while the printed circuit boards 13 are connected through the connectors 16 to the driving circuit (not shown). The base 24 may be fabricated from a thin plate by electric discharge machining or by pressure forming of resins. As shown in FIG. 9 both the side surfaces of the base 24 are formed with alternating first and second ink chambers 23 and 19 so that the density of ink drop issuing cells may be increased. The diaphragms 25 are brazed or welded to the base 24. Thereafter the second diaphragm 18, the nozzle plate 21 and the first piezoelectric elements 20 are ink-tightly bonded to the first diaphragms 25, and then the second piezoelectric element 12 is bonded to the second diaphragm 18.

In summary, according to the present invention, a bias pressure is applied to the ink so that the first or ink issuing piezoelectric elements may be reduced in size and consequently the ink drop generator units may be also reduced in size so that the density of the nozzles of the nozzle matrix type ink drop generator may be remarkably increased. Furthermore when both the side walls of the base 24 are formed with alternating ink drop generator cells each consisting of the first and second ink chambers 23 and 19, the density of the nozzles per unit area in a matrix array may be further increased.

What is claimed is:
1. A system for driving an ink drop generator comprising:
   (A) a first ink drop issuing chamber provided with a first diaphragm and communicating with an ink drop issuing nozzle,
   (B) a second pressure biasing chamber provided with a second diaphragm for exerting a bias pressure to the ink in said second chamber and communicating with said first ink chamber and an ink source,
   (C) means for driving said second diaphragm at a predetermined frequency, and

(D) means for driving said first diaphragm at a frequency twice as high as the frequency of said second diaphragm in synchronism with the driving of said second diaphragm during the positive going half cycle of the driving voltage applied to said second diaphragm to thereby issue ink drops through said nozzle.

2. A system for driving an ink drop generator, comprising:
- (A) a plurality of first ink drop issuing chambers each communicating with an ink drop issuing nozzle,
- (B) a plurality of second pressure biasing chambers each of which communicates with a common ink source and with each of said plurality of first ink chambers,
- (C) pairs of said first and second chambers being alternately formed in both the side surfaces of a base of a multiple nozzle ink drop generator unit;
- (D) first transducer means for applying alternating pressure to ink in said first chambers;
- (E) second transducer means for applying alternating pressure to ink in said second chambers; and
- (F) means for driving said first transducer means at a frequency twice as high as the frequency of said second transducer means in synchronism with the driving of said transducer means during the positive going half cycle of the driving voltage applied to said second transducer means to thereby issue ink drops through said nozzles.

3. An ink drop generator with an array of nozzle matrix comprising:
a plurality of multiple nozzle ink drop generator units assembled in side-by-side relationship and communicated with a common ink source,
each ink drop generator unit comprising
- (A) a base whose both side surfaces are alternately formed with a plurality of ink drop generating cells each consisting of a first ink drop issuing chamber and a second pressure biasing chamber communicating with said common ink source and said first ink chamber,
- (B) two first diaphragms ink-tightly bonded to said base to define four side walls of said ink drop generator unit,
- (C) a plurality of first piezoelectric elements mounted on said first diaphragms in opposed relationship with respective first ink chambers in said base,
- (D) a second diaphragm ink-tightly bonded to said base to define the top wall of said ink drop generator unit,
- (E) a common second piezoelectric element mounted on said second diaphragm,
- (F) a nozzle plate ink-tightly bonded to said base to define the bottom of said ink drop issuing nozzles which are lined up and communicate with respective first ink chambers,
- (G) printed circuit boards attached to said first diaphragms to establish the electrical connection between the first piezoelectric elements and a first piezoelectric element driving circuit,
- (H) connection means for establishing the electrical connection between said second piezoelectric element and a second piezoelectric element driving circuit,
- (I) said second piezoelectric element being driven by a second driving voltage from said second piezoelectric element driving circuit in such a way that the pressure imparted to the ink in said ink drop generating cell by said second piezoelectric element will not cause the ink to issue through said nozzle,
- (J) said first piezoelectric element being driven by a first driving voltage or an ink drop placement signal voltage from said first piezoelectric element driving circuit, the frequency of said first driving voltage being twice as high as that of said second driving voltage, said first driving voltage being applied in synchronism with said second driving voltage to one or more selected first piezoelectric elements during the positive going half cycle of said second driving voltage in such a way that one or more ink drops may be issued through one or more nozzles during the positive going half cycle of said first driving voltage.

* * * * *